INVENTOR.
RALPH R. TILLY

July 4, 1967  R. R. TILLY  3,329,029
OFF-CENTER LOAD MOVING ASSEMBLY
Original Filed Nov. 1, 1963  3 Sheets-Sheet 3

INVENTOR.
RALPH R. TILLY
BY
ATTORNEY

United States Patent Office 3,329,029
Patented July 4, 1967

3,329,029
OFF-CENTER LOAD MOVING ASSEMBLY
Ralph R. Tilly, Webster, N.Y., assignor to Xerox Corporation, Rochester, N.Y., a corporation of New York
Continuation of application Ser. No. 320,630, Nov. 1, 1963. This application Mar. 21, 1966, Ser. No. 543,469
1 Claim. (Cl. 74—89.15)

ABSTRACT OF THE DISCLOSURE

Apparatus for vertically displacing a non-symmetrically distributed load along a vertically disposed rotatable shaft. Screw threads on the shaft are engaged by a shiftable threaded sleeve which is constrained against rotation. The threaded sleeve is fixedly secured with respect to the load as well as to a pair of annular sleeve bearings encompassing the shaft so that rotation of the shaft and screw threads will axially displace the threaded sleeve, sleeve bearings and load along the shaft.

This application is a continuation of my co-pending application Serial No. 320,630 filed November 1, 1963, now abandoned, entitled Bearing Assembly.

This invention relates to an assembly for moving an off-center load relative to a vertically disposed rotatable shaft.

The movement of a load in a longitudinal direction along a vertically disposed rotating shaft encounters frictional problems. The power necessary to drive the load along the shaft must overcome both the friction due to the sliding movement along the shaft and the friction due to the rotational movement of the shaft within the bearing. When the load being moved is off-center or non-symmetrically distributed, the sliding and rotational frictional forces are further increased by the moment force or torque which tends to rotate the load. The invention, herein, is particularly useful for moving such a load where off-center loading produces the large frictional forces.

It is, therefore, the primary object of this invention to move a load along a rotating shaft.

It is another object of this invention to improve load moving apparatus to reduce the driving power necessary to move an off-center load in a longitudinal plane along a vertically disposed rotating shaft.

These and other objects of the invention are attained by mounting a non-symmetrical load on a vertically disposed rotatable shaft and having apparatus operatively interconnecting the shaft and load so that rotation of the shaft acts to turn a sleeve bearing inside a ball bearing and to raise or lower the load through a vertical plane by sliding the sleeve bearing along the shaft.

For a better understanding of the invention, as well as other objects and further features thereof, reference is had to the following detailed description of the invention to be read in connection with the accompanying drawings, wherein.

Referring to the figures, there is shown a piece of xerographic reproducing apparatus embodying the present invention. The apparatus used herein to illustrate the use of the invention is a large document copying apparatus which moves a document to be copied on a conveyor and transmits a light image of the document through an optical system to a xerographic drum.

Figure 1:
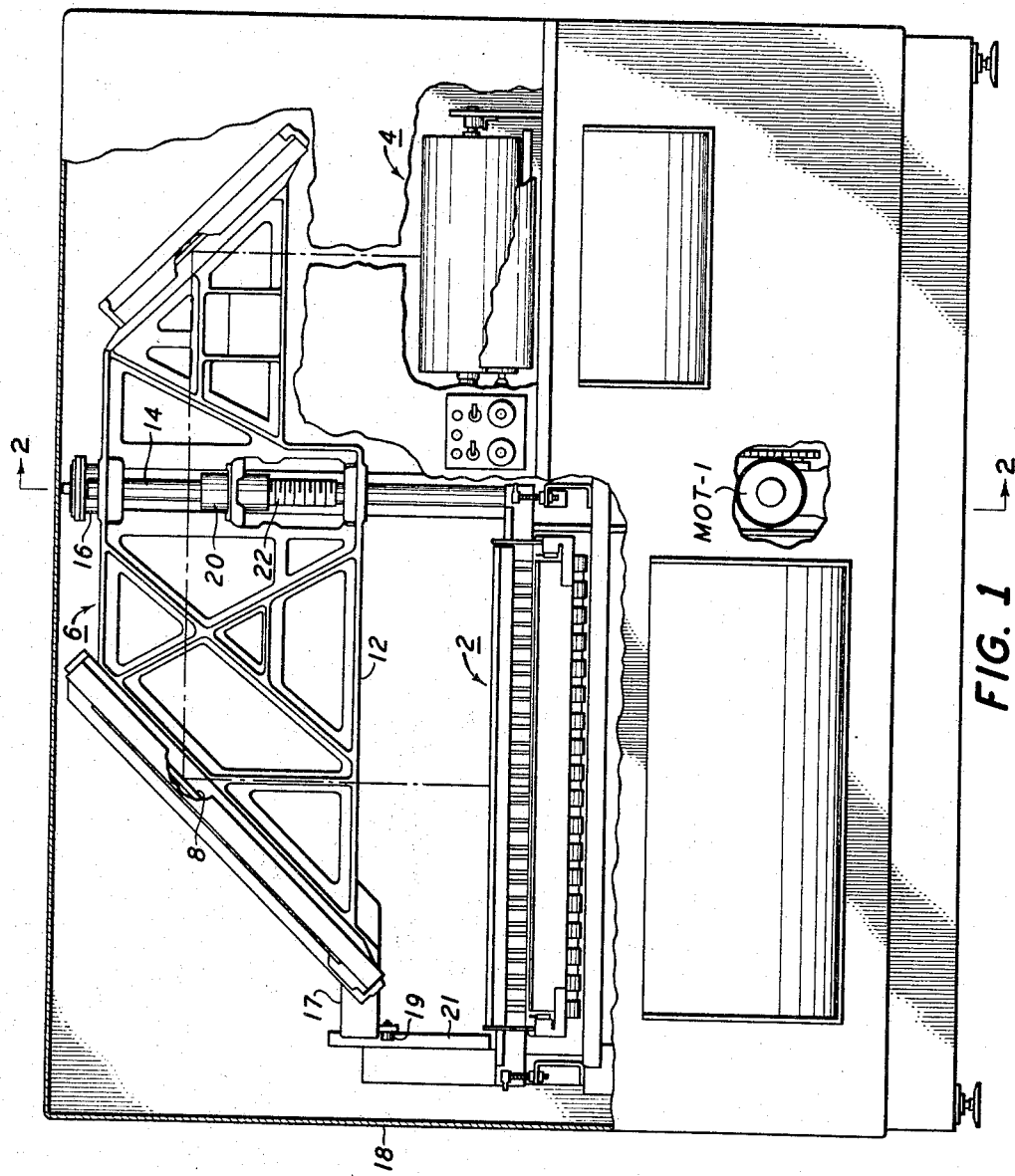
FIG. 1 is a front view of a xerographic reproducing apparatus, with covers broken away, which is adapted to use the present invention.
Figure 2:
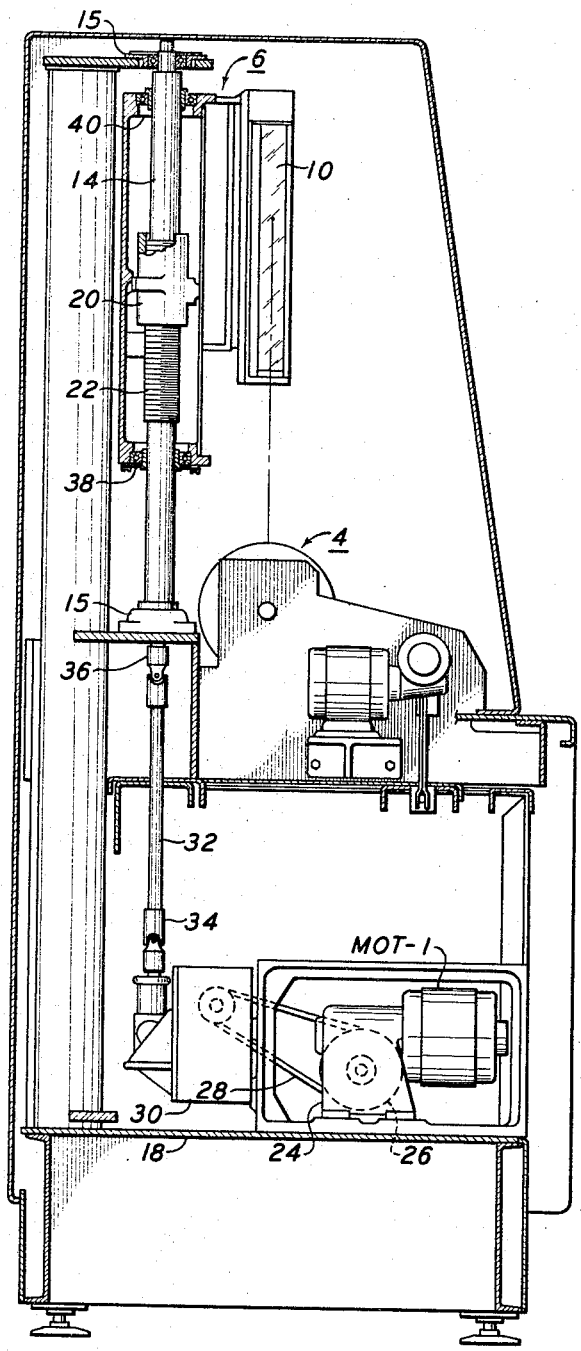
FIG. 2 is a cross-sectional side view of the piece of apparatus shown in FIG. 1 and taken along lines 2—2 of FIG. 1.

FIG. 1 shows a document conveyor 2, a xerographic drum 4, and an optical assembly 6. The optical assembly 6 contains a pair of mirrors 8 and 10 mounted above the conveyor and the xerographic drum, respectively. The mirrors 8 and 10 are mounted on a frame 12 which is supported by a lead screw 14.

The lead screw 14 is rotatably supported in an upright position by a pair of bearing assemblies 15 extending outward from a mast or column 16. The bearing assemblies 15 are thrust bearings which prohibit any vertical motion of the lead screw 14. The column 16 is mounted on the frame 18 of the apparatus and provides rigid support for the entire optical assembly. In order to make enlargements or reductions of a document on the conveyor system, it is necessary to vary the height of the optical assembly 6 and the length of the reflected light path through the mirrors 8 and 10. Therefore, the assembly 6 is supported by means of a nut or threaded sleeve 20 on a threaded portion 22 of the lead screw 14. When a document is placed on the conveyor, a pair of fluorescent lights, not shown, illuminate a portion of the document so that light is reflected off the document into the mirror 8, to the mirror 10 and onto the xerographic drum 4. A movable lens system may be mounted on the frame 12 between the mirrors 8 and 10 to provide the necessary image focusing for enlargement or reduction purposes.

The frame 12 is held in alignment by means of an arm 17 secured thereto, which contains a pair of rollers 19 riding, vertically, on a guide post 21 secured to the conveyor. When the lead screw 14 is rotated, the frame 12 is prevented from rotating by the rollers 19 and guide post 21 so that the lead screw rotates relative to the nut 20. The rotational movement of the lead screw causes the nut 20 and frame 12 to move in an upward or downward direction, thus extending or shortening the reflected light path.

Rotational drive of the lead screw 14 is produced by motor MOT-1 through gear box 24, pulley 26 and the belt 28 to a transmission 30. The transmission 30 is adapted to drive the lead screw in either direction depending on whether upward or downward movement of the optical frame is desired. A linkage 32 and two universal joints 34 and 36 connect the transmission to the lead screw. As the lead screw is rotated, the nut of threaded sleeve 20 moves upward or downward depending upon the direction of rotation. As the nut 20 moves, it slides the optical assembly 6 along the shaft of the lead screw 14 on bearing assemblies 38 and 40.

The weight of the optical assembly 6 is not uniformly distributed about the lead screw 14. As can be seen in FIG. 1, the document conveyor 2 is wider than the xerographic drum 4 so that documents that are larger than the width of the xerographic drum 4 can be reproduced by reduction of the image size. Therefore, the mirror 8, over the document conveyor, must necessarily be larger than the mirror 10, over the xerographic drum 4, and, likewise, the frame 12 must extend further from the lead screw 14 out over the conveyor than the corresponding portion over the xerographic drum. This nonsymmetrical distribution of weight produces forces in the bearing assemblies 38 and 40 which would not normally be produced if the center of gravity of the optical assembly 6 were centered over the lead screw 14. As such, this peculiar weight distribution exhibits a moment or force which tends to rotate the load or frame within the plane through which it is movable.

The nonuniform distribution of weight on the optical assembly 6 tends to cause rotation about the nut 20 and to set up nonvertical forces in the bearing assemblies 38 and 40. The actual forces produced in the bearings 38 and 40 may be calculated by determining the distance from the lead screw 14 to the point at which the total load of the optical assembly is concentrated, by knowing the distance of each bearing from the nut 20, and by taking the summation of forces about a point, such as the nut 20. The moment forces produced in each of the bearings 38 and 40 increases the friction, both in the sliding movement and in the rotational movement of the shaft relative to the frame.

Figure 3:
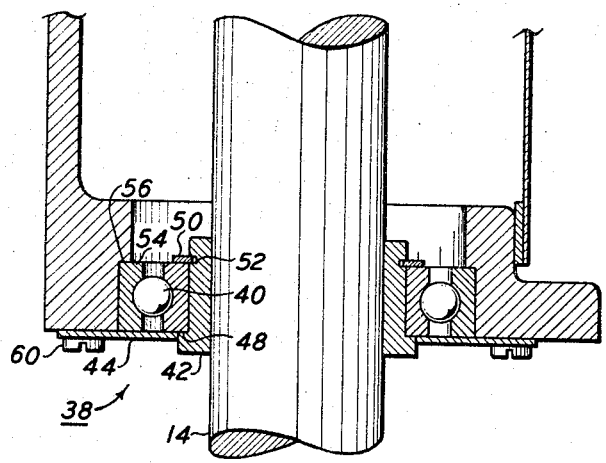
FIG. 3 is an enlarged cross-sectional view of the bearing assembly.

The torque required to drive the lead screw is increased by the torque necessary to overcome the sliding friction and the rotating friction. Since the torque required to overcome the rotating friction is the largest of the two, it is very desirable to reduce or eliminate this requirement. The bearing structure, shown in detail in FIG. 3, accomplishes this by using a sleeve bearing 42 on the shaft of the lead screw 14 and a ball bearing 44 mounted between the sleeve bearing 42 and the frame 12.

The sleeve bearing 42 is freely movable along the shaft. The inner race 46 of the ball bearing 44 is mounted around the sleeve bearing and is retained by the shoulder 48. A snap ring 50, which fits in a groove 52, in the outer surface of the sleeve bearing retains the ball bearing in position relative to the sleeve bearing. The outer race 54 fits into an annular shouldered groove 56 in the frame 12 and is retained therein by an annular retaining ring 58 fastened to the frame 12 by screws 60.

The shaft is freely slidable within the sleeve bearing 42 and the sleeve bearing 42 is freely rotatable relative to the frame 12 by means of the ball bearing 44. There is little or no relative rotary motion between the shaft and the sleeve bearing since the friction between these two parts is considerably higher than the friction produced in the ball bearing.

The rotational movement of the sleeve bearing 42 within the ball bearing 44 reduces the rotational friction. The sliding friction of the sleeve bearing relative to the shaft remains unchanged but, as pointed out above, the larger portion of the load due to friction is produced by the rotational friction and, with the use of the bearing described, the rotational friction is virtually eliminated.

The sleeve bearing 42 is preferably a split bearing consisting of two halves split longitudinally along the bearing. In the event that the bearing is to be replaced, the snap ring 50 may be removed and the bearing slid along the shaft and removed from the shaft without disassembling the optical system.

While the present invention, as to its objects and advantages, as described herein, has been carried out in a specific embodiment thereof, it is not desired to be limited thereby but it is intended to cover the invention broadly within the scope of the appended claim.

What is claimed is:

Apparatus for vertically moving a load within a vertical plane, the load being nonsymmetrically distributed so as to exhibit large rotational forces within the plane through which it is movable, including
  a shaft,
  positioning means adjacent the ends of the shaft to rotatably retain the shaft in a vertical orientation, fixed against axial displacement,
  a pair of annular sleeve bearings mounted on the shaft between the positioning means, the sleeve bearings being adapted for axial displacement along the shaft,
  a threaded lead screw on the shaft located between the sleeve bearings,
  a threaded sleeve encompassing the threaded lead screw, the threaded sleeve being held against rotation but free for vertical movement in response to rotation of the shaft and lead screw.
  retaining means to hold the sleeve bearings, threaded sleeve and load fixed with respect to each other, with the load located between the sleeve bearings,
  ball bearing means rotatably securing each of the sleeve bearings to the retaining means, and
  drive means to rotate the shaft and lead screw for vertically displacing the load in response to the vertical motion of the threaded sleeve, sleeve bearings, and retaining means.

References Cited
UNITED STATES PATENTS

| | | | |
|---|---|---|---|
| 1,212,353 | 1/1917 | Hofferberth | 74—89.15 |
| 2,025,834 | 12/1935 | Tautz | 64—9 |
| 2,708,497 | 5/1955 | Parrett | 192—98 |
| 2,986,430 | 5/1961 | Banerian | 308—35 |
| 3,222,494 | 12/1965 | O'Connor | 308—6 |

FRED C. MATTERN, JR., *Primary Examiner.*

W. S. RATLIFF, *Assistant Examiner.*